(12) United States Patent
Heppe

(10) Patent No.: US 10,745,214 B2
(45) Date of Patent: Aug. 18, 2020

(54) ROTARY UNION FOR A CONVEYOR SYSTEM AND CONVEYOR SYSTEM WITH A ROTARY UNION, AS WELL AS METHOD FOR CONVEYING OBJECTS FROM WORKSTATION TO WORKSTATION

(71) Applicant: FRESENIUS MEDICAL CARE DEUTSCHLAND GMBH, Bad Homburg (DE)

(72) Inventor: John Heppe, St. Wendel (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 1 day.

(21) Appl. No.: 16/318,378

(22) PCT Filed: Jul. 18, 2017

(86) PCT No.: PCT/EP2017/068157
§ 371 (c)(1),
(2) Date: Jan. 17, 2019

(87) PCT Pub. No.: WO2018/019668
PCT Pub. Date: Feb. 1, 2018

(65) Prior Publication Data
US 2019/0283979 A1    Sep. 19, 2019

(30) Foreign Application Priority Data
Jul. 26, 2016    (DE) ........................ 10 2016 008 948

(51) Int. Cl.
*B65G 47/84*    (2006.01)
*B65B 3/00*    (2006.01)
(Continued)

(52) U.S. Cl.
CPC ............ *B65G 47/846* (2013.01); *B23Q 7/02* (2013.01); *B23Q 39/042* (2013.01); *B65B 3/003* (2013.01);
(Continued)

(58) Field of Classification Search
CPC ...... B65G 29/00; B65G 47/80; B65G 47/846; B65B 3/003; B65B 43/50; B65B 61/186;
(Continued)

(56) References Cited

U.S. PATENT DOCUMENTS 4,380,939 A * 4/1983 Gardner ............... B23Q 1/0027
198/345.2
4,620,359 A * 11/1986 Charlton ............... B23Q 1/5406
198/803.13
(Continued)

FOREIGN PATENT DOCUMENTS

DE    10343378 A1 * 5/2005 ............... B23Q 7/00
DE    10343378 A1    5/2005
(Continued)

OTHER PUBLICATIONS

International Search Report issued in corresponding International Patent Application No. PCT/EP2017/068157 (with English translation) dated Mar. 13, 2018 (10 pages).
(Continued)

*Primary Examiner* — Gene O Crawford
*Assistant Examiner* — Keith R Campbell
(74) *Attorney, Agent, or Firm* — Kilyk & Bowersox, P.L.L.C.

(57) ABSTRACT

A rotary feedthrough for a transport device having a rotary object carrier 3 with object carrier elements 6 arranged to be distributed around the circumference, on which carrier elements objects are placed which are transported on a circular movement path from work station to work station of a
(Continued)

Figure 1:
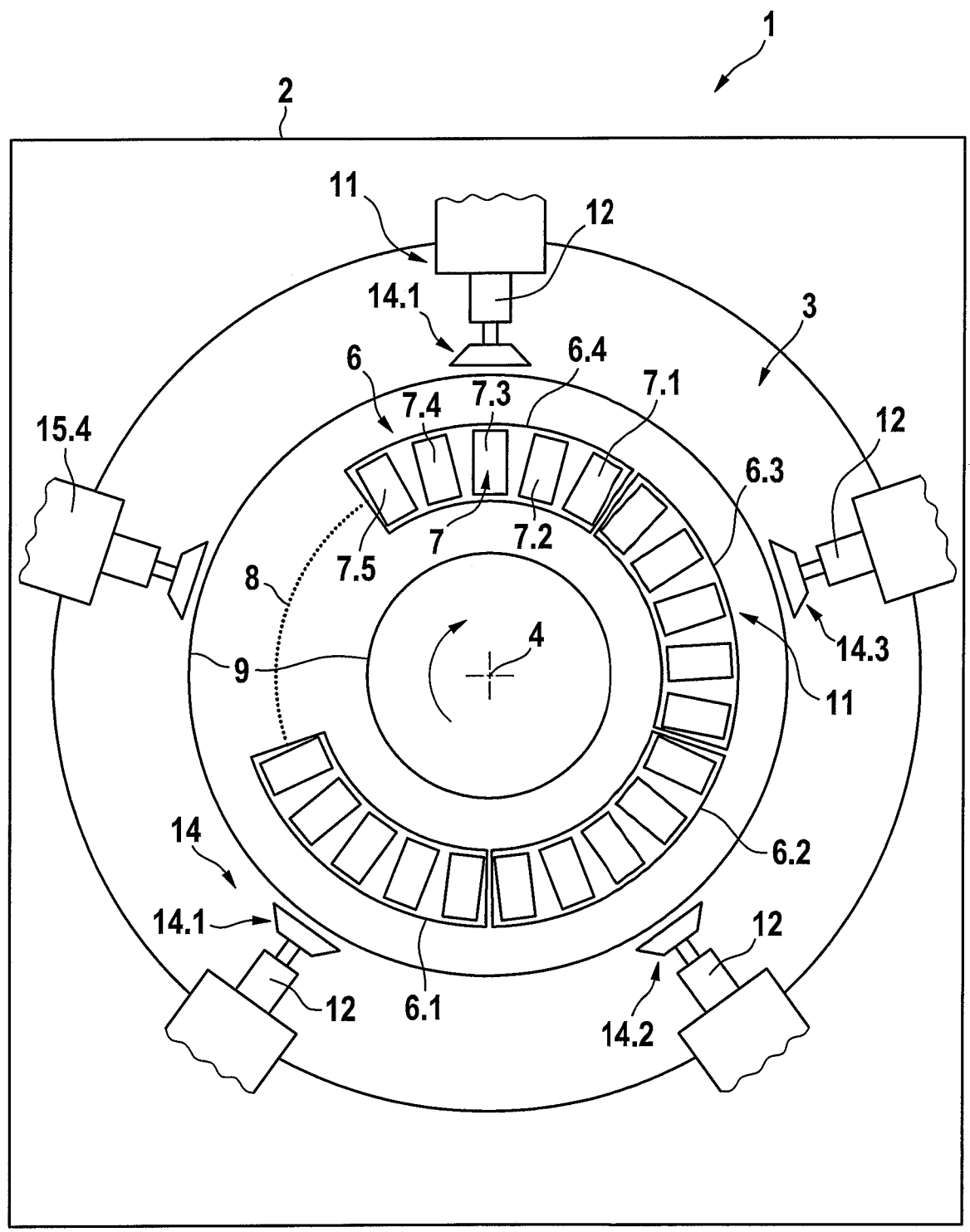

production facility. A transport device, a production facility for making products, and a method for transporting objects from work station to work station of a production facility are also described. The rotary feedthrough has a stationary component 19 having media inputs 20.1, 20.2, 20.3 for providing media for supplying actuator units 12.1, 12.2; 18.1, 18.2 of an object carrier element 6.1, 6.2. The rotary feedthrough has a plurality of components 24.1, 24.2, 24.3, 24.4 which are rotatable independently of one another about a common central axis 23 relative to the stationary component 19 and which each has media outputs 25.1, 25.2.

18 Claims, 8 Drawing Sheets

(51) Int. Cl.
- *B65B 43/50* (2006.01)
- *B65B 65/00* (2006.01)
- *B65G 47/80* (2006.01)
- *B23Q 39/04* (2006.01)
- *B23Q 7/02* (2006.01)
- *B67C 3/00* (2006.01)
- *B65B 61/18* (2006.01)

(52) U.S. Cl.
CPC ............ *B65B 43/50* (2013.01); *B65B 65/003* (2013.01); *B65G 47/80* (2013.01); *B65B 61/186* (2013.01); *B67C 3/00* (2013.01)

(58) Field of Classification Search
CPC ...... B23Q 7/02; B23Q 7/1426; B23Q 39/042; B67C 3/00
See application file for complete search history.

(56) References Cited

U.S. PATENT DOCUMENTS

| | | | | |
|---|---|---|---|---|
| 4,850,764 | A * | 7/1989 | Rutschle | B23Q 1/0009 409/198 |
| 5,878,633 | A | 3/1999 | Grund et al. | |
| 9,566,678 | B2 * | 2/2017 | Garcia Calderon | B23Q 1/38 |
| 2019/0105749 | A1 * | 4/2019 | Heppe | B23Q 16/10 |
| 2019/0283193 | A1 * | 9/2019 | Heppe | B65G 47/846 |

FOREIGN PATENT DOCUMENTS

| | | | |
|---|---|---|---|
| EP | 0570734 A1 * | 11/1993 | ............ F16L 39/04 |
| EP | 0570734 A1 | 11/1993 | |
| EP | 0802016 A1 | 10/1997 | |
| EP | 0901877 A2 | 3/1999 | |
| SU | 1000216 A1 | 2/1983 | |

OTHER PUBLICATIONS

International Preliminary Report on Patentability issued in corresponding International Patent Application No. PCT/EP2017/068157 dated Jan. 29, 2019 (10 pages).

* cited by examiner

ROTARY UNION FOR A CONVEYOR SYSTEM AND CONVEYOR SYSTEM WITH A ROTARY UNION, AS WELL AS METHOD FOR CONVEYING OBJECTS FROM WORKSTATION TO WORKSTATION

This application is a National Stage Application of PCT/EP2017/068157, filed Jul. 17, 2017, which claims priority to German Patent Application No. 10 2016 008 948.2, filed Jul. 26, 2016.

The invention relates to a rotary feedthrough for a transport device comprising a rotary object carrier which comprises object carrier elements that are arranged so as to be distributed around the circumference and on which objects are arranged which are transported on a circular movement path from work station to work station of a production facility. Furthermore, the invention relates to a transport device comprising such a rotary feedthrough and to a production facility for producing products, in particular containers filled with a medical product, comprising such a transport device. Furthermore, the invention relates to a method for transporting objects from work station to work station of a production facility.

In production facilities for producing products, rotary tables, which are also referred to as rotating work tables or rotary indexing tables, are used for transporting the products from work station to work station. The known rotary indexing tables comprise a circular object carrier that can turn about a vertical axis. The object carrier is driven by a drive unit. During production, the object carrier turns in steps in individual cycles either clockwise or anticlockwise. The work stations are distributed circumferentially around the object carrier. The objects to be processed are positioned on the object carrier in a manner distributed circumferentially. As a result of the object carrier turning, the objects can be transported from work station to work station. The work stations each perform a work process on the objects, which process may include one or more production steps. The objects can be arranged on the object carrier in object carrier elements which receive one or more objects. The objects can be products to be produced (goods) or workpieces or test objects to be machined.

The known rotary indexing tables have an object carrier on which the object carrier elements are arranged immovably relative to one another. They are secured circumferentially on the object carrier at predefined distances. In conjunction with the stationary work stations, the object carrier elements are moved into the appropriate position opposite each work station purely by the object carrier turning. The object carrier elements have to remain at the stations until the work station has completed the work process.

Production facilities generally have work stations having different process times. In the process, the step-by-step turning of the object carrier is substantially defined by the duration of the longest process. Since the object carrier remains still during a work process having a long process time, and owing to the predefined distances between the object carrier elements and the step-by-step turning of the object carrier through a predefined angle of rotation, a separate work station is required for processing each object, even for the work processes having the short process times. However, said work stations are only in use for a short time, which entails high investment and running costs and is inefficient. Moreover, as the number of work stations increases, so too does the likelihood that the production facility will break down. Production facilities of this type are characterised by high complexity and a lack of access to the components.

If the production method comprises work processes having different process times, for the above reasons it is an advantage to use a transport device in which the arrangement of the object carrier and the object carrier elements is not rigid, so that some object carrier elements can remain at work stations having a long process time, whilst other object carrier elements can be transported from work station to work station. It is also an advantage if the objects can be influenced not only by devices provided on the work stations, but also by devices provided on the object carrier elements. However, said devices need to be supplied with media. Pneumatic actuation members require a supply of compressed air for example.

Rotary feedthroughs are known for transferring media, for example fluids or gases, which have a stationary component and a rotary component. The stationary component has a media input and the rotary component has a media output. In the stationary component, an axial channel is formed leading to a radial bore which is sealed off from an annular gap formed in the rotary component. The sealing surfaces of the stationary and the rotary component are sealed by means of known sliding or rotary seals. In order to transfer a plurality of fluids, multichannel rotary feedthroughs are also known in which a plurality of axial channels are formed in the stationary component, which channels each have a radial bore, a plurality of annular gaps being formed in the rotary component. The multi-channel rotary feedthroughs are characterised, however, by only a single rotary component.

The object of the invention is to improve a production method in which objects are transported from work station to work station of a production facility. In particular, the object of the invention is to provide a rotary feedthrough for a transport device comprising a rotary object carrier which allows a flexible configuration of the production process. Another object of the invention is to create a transport device and a production facility for producing products which has a relatively simple construction and allows the flexile configuration of the production process. The object of the invention is also to specify a method for transporting objects from work station to work station which allows a flexible configuration of the production process.

These objects are achieved according to the invention by the features of the independent claims. The dependent claims relate to advantageous embodiments of the invention.

The rotary feedthrough according to the invention, which comprises a stationary component having one or more media inputs for providing one or more media in order to supply one or more actuator units of an object carrier element, is intended for a transport device having a rotary object carrier which comprises object carrier elements distributed around the circumference, at least one object carrier element of which is arranged on the object carrier so as to be displaceable relative to the object carrier on a circular path or can be locked in place on the object carrier.

The rotary feedthrough according to the invention differs from the known rotary feedthroughs in that a plurality of components are provided which are rotatable independently of one another about a common central axis relative to the stationary component and each comprise one or more media outputs. The stationary component and the rotary components are designed such that a media connection is formed between a media input of the stationary component and a media output of a rotary component or a plurality of media inputs of the stationary component and a plurality of media outputs of the rotary components. The rotary feedthrough thus enables the formation of a media connection between actuator units which are assigned to object carrier elements and can be moved on a circular movement path on an object carrier or can remain on the object carrier in a fixed position, and a fixed, central supply device, i.e. independent of the movement of the object carrier elements. In this way, the construction of the transport device and the whole production facility can be simplified. The production method can be configured in a flexible manner, having actuation members (actuators) assigned to the object carrier elements. Furthermore, the programming of the production facility is simplified, as the actuators are assigned to the object carrier element and do not need to engage from the outside.

In this context, media includes both gaseous media, for example compressed air, and fluid media, for example medical fluids. Supplying with a medium can also be understood to mean a power supply. For a power supply, the supply lines are power lines, it being possible for sliding contacts to be provided at the transition from the stationary component and the rotary component. For the data transmission a bus system can be used, for example a field bus, in particular having the PROFIBUS (Process Field Bus) standard.

Object carrier elements are understood to be any element on which one or more objects can be set down or arranged. The objects can be loose on the object carrier elements or fixed in place on the object carrier elements.

Actuator units are understood to be all units which can be used to influence an object assigned to an object carrier element, or by means of which measurement values can be recorded, as well as all units which are used for actuating components which are relevant for controlling the process. The actuator units can influence the objects in different ways in order to perform individual process steps or record different measurement values. For example, the influences can be physical and/or chemical. The actuator units can exert force on the objects for example.

According to a preferred embodiment of the rotary feedthrough, each rotary component of the rotary feedthrough comprises a coupling element which is designed such that the rotary component can be coupled to an object carrier element. The coupling element can be designed in various ways. The only essential consideration is that the object carrier element, which can move relative to the object carrier, carries with it the associated rotary component. In a particularly advantageous embodiment, the coupling element is a rod or linkage.

In particularly advantageous embodiments, one or more media lines, which direct one or more media to the object carrier element, are held in the coupling element and/or guided along the coupling elements starting from the media output or media outputs of the rotary component.

According to a preferred embodiment of the rotary feedthrough, the stationary component is designed as a cylindrical body and the rotary components are designed as a bodies that surround the stationary component, the rotary components being arranged one above the other so as to rotate about the central axis of the stationary component. This results in a compact construction of the rotary feedthrough.

If the actuator units are only supplied with one medium, for example with compressed air, the rotary feedthrough according to the invention can have only one media input to which compressed air is supplied centrally. One or more axial channels can be formed in the stationary component. Each axial channel can have one or more radial bores assigned to a rotary component. Each rotary component can have one or more annular gaps which are each sealed off from for a radial bore in order to transmit the medium.

The rotary components can be of different shapes. A particularly compact construction is obtained if the rotary components are designed as annular bodies which can each comprise one or more radial media outputs.

The transport device according to the invention for transporting objects from work station to work station comprises a rotary object carrier which has object carrier elements arranged so as to be distributed around the circumference, at least one object carrier element of which is arranged on the object carrier so as to be displaceable relative to the object carrier on a circular path or can be locked in position on the object carrier, and comprises the rotary feedthrough according to the invention.

A preferred embodiment of the transport device according to the invention provides a central media supply facility which is connected to one or more media inputs of the rotary feedthrough by means of one or more supply lines for providing one or more media.

In a preferred embodiment, the rotary feedthrough is arranged such that the stationary component is arranged centrally on the object carrier or penetrates the object carrier in the centre, it being possible for the rotary components to be arranged at the same level or deeper or higher in relation to the object carrier elements. The object carrier elements can therefore be arranged so as to be distributed around the circumference of the rotary components. As a result, the medium can be provided to the actuation members from above or from below or from the side.

The object carrier elements can each comprise one or more actuator units, the one or more actuator units being connected to the one or more media outputs of a rotary component by means of connection lines in order to provide one or more media. The connection lines can be flexible hose lines. However, it is also possible for rigid lines to be provided which can simultaneously perform the function of the coupling elements.

The transport device according to the invention is preferably characterised in that a dog element and a retaining element are assigned to the at least one object carrier element. The dog element can assume an active state, in which relative movement between the object carrier element and object carrier is prevented, and an inactive state, in which relative movement between the object carrier element and object carrier is permitted. The dog element can be moved or switched between these two states. The retaining element can assume an active state, in which the object carrier element is held in place, and an inactive state, in which the object carrier element is released. The retaining element can be moved or switched between these two states.

The at least one dog element and the at least one retaining element are actuated by means of an actuation unit. The actuation unit for the dog elements and the retaining elements can have actuating members, by which dog and retaining elements can be moved between the two positions. Such actuation members are also understood as actuator units within the meaning of the present invention. The actuation unit can for example be an electric motor drive and/or a pneumatic drive and/or a hydraulic drive.

The actuation unit is designed such that, in some cycles of the successive cycles, the dog element assumes an active state and the retaining element assumes an inactive state such that the object carrier element in question is carried along by the object carrier and moved from work station to work station. The actuation unit is also designed such that, in some cycles of the successive cycles, the dog element assumes an inactive state and the retaining element assumes an active state such that the object carrier element remains at a work station.

The actuation of the at least one dog element and retaining element by the actuation unit thus allows the object carrier to move in order to transport objects to a work station that has a short process time whilst an object carrier element remains at a work station having a long process time.

If the overall production process having a plurality of work processes has just one work process that has a long process time, it is sufficient in principle for just one object carrier element to be arranged on the object carrier so as to be displaceable relative to the object carrier in the direction of the movement path on which the object carrier elements can be transported from work station to work station. This object carrier element can then remain at the work station having the long process time. If there is just one object carrier element, only one dog element and retaining element is required. If there are two object carrier elements, for example, at least two dog elements and retaining elements are required if the two carrier elements are to be controlled independently of one another.

In a preferred embodiment of the transport device, all the object carrier elements can move freely on the object carrier, each object carrier element being assigned a dog element and a retaining element. As a result, all the object carrier elements can be controlled independently of one another.

A particularly preferred embodiment provides a circular guide path in which the object carrier elements are guided so as to be freely movable in relation to the object carrier such that they can be held in place in relation to a fixed spatial coordinate system. The guide path can have various designs. The only important factor is that the object carrier elements can move only on the movement path.

To receive the objects, the object carrier elements preferably comprise receiving elements into or onto which the objects can be inserted or placed, respectively. Therefore, the objects are adequately fixed on the object carrier elements.

The dog elements and retaining elements can have various designs. The only important factor is that the object carrier elements can be fixed adequately. They can be fixed by an interlocking and/or frictional connection. The dog elements are preferably designed such that they establish an interlocking or frictional connection between a part of the object carrier element and a part of the object carrier, whereas the retaining elements are designed such that an interlocking or frictional connection is established between a part of the object carrier element and a stationary component.

By means of the control of the drive unit of the object carrier and the actuation of the dog and retaining elements, the object carrier elements, together with the objects, are positioned in the desired processing position opposite each work station and can be moved on from one work station to another work station.

The transport device according to the invention can be used in different production facilities. In a particularly preferred embodiment, the transport device according to the invention is used in a production facility for producing containers filled with a medical product, in particular a medicine, and in particular is used in a production facility for producing medical solution bags, for example solution bags for peritoneal dialysis, acute haemodialysis or the infusion technique.

The method according to the invention for transporting objects from work station to work station of a production facility comprises the following work steps:

arranging a plurality of object carrier elements for placing down one or more objects on a rotary object carrier, rotating the object carrier in successive cycles such that the object carrier elements are transported from work station to work station on a circular movement path, wherein at least one object carrier element of the plurality of object carrier elements is arranged on the object carrier so as to be displaceable relative to the object carrier in the direction of the circular movement path, in individual cycles of the successive cycles, a relative movement of the at least one object carrier element and the object carrier is prevented, so that the at least one object carrier element is carried along by the object carrier and moved from work station to work station, and in individual cycles of the successive cycles, a relative movement of the at least one object carrier element and the object carrier is permitted and the at least one object carrier element is held securely so that the at least one carrier element remains at a work station.

The method according to the invention is characterised in that actuator units (actuation members) which are arranged on the object carrier elements are supplied with one or more media, the medium or media being provided to the object carrier elements via a rotary feedthrough, in particular the rotary feedthrough according to the invention. Providing the medium or media via the rotary feedthrough according to the invention has the advantage that actuation members provided on the object carrier elements can be operated.

Figure 2:
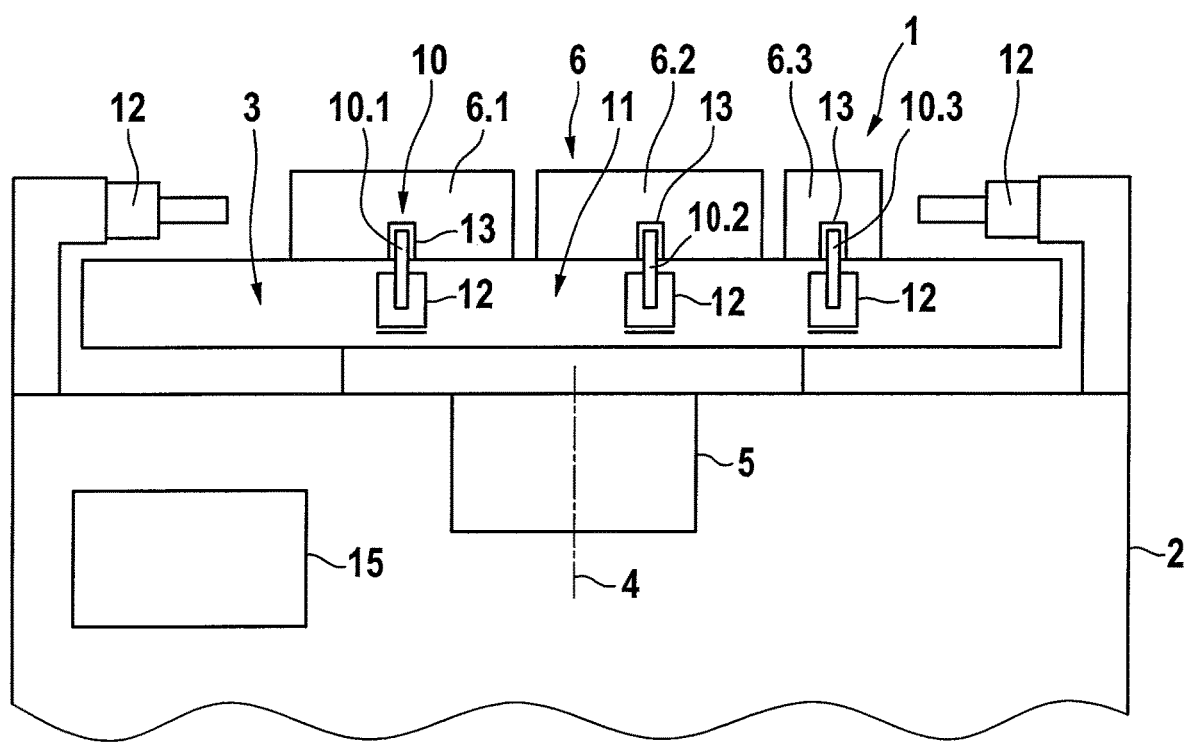
Figure 3:
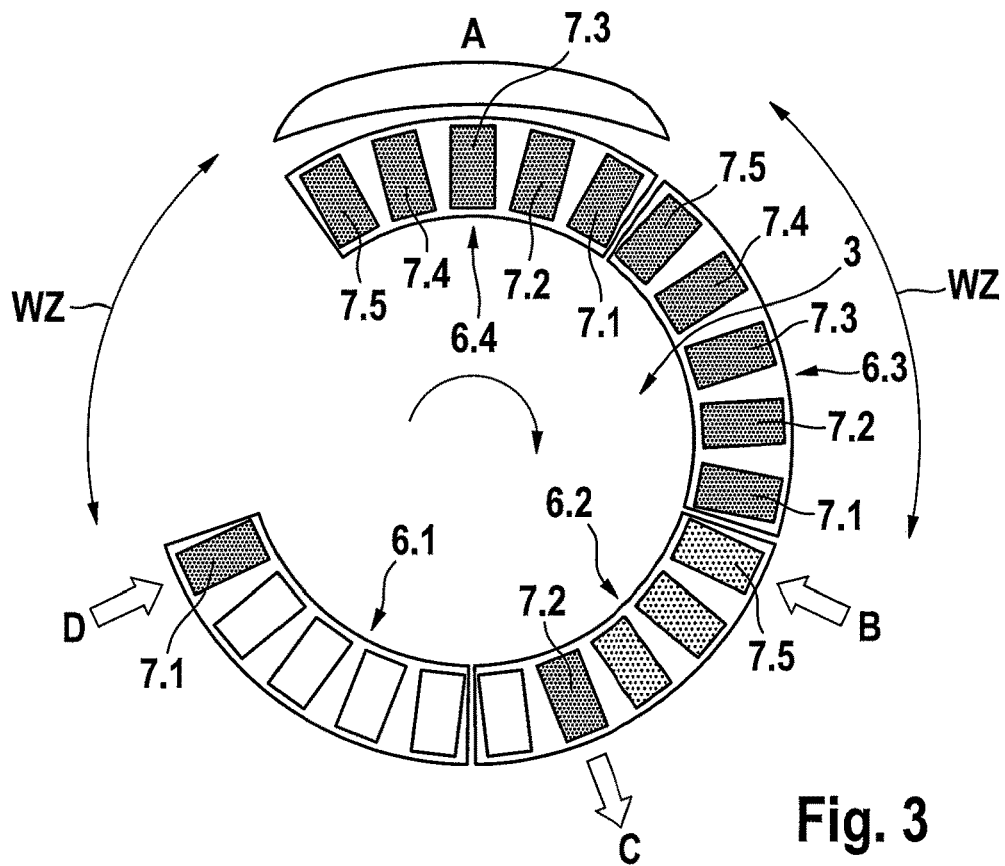
Figure 4:
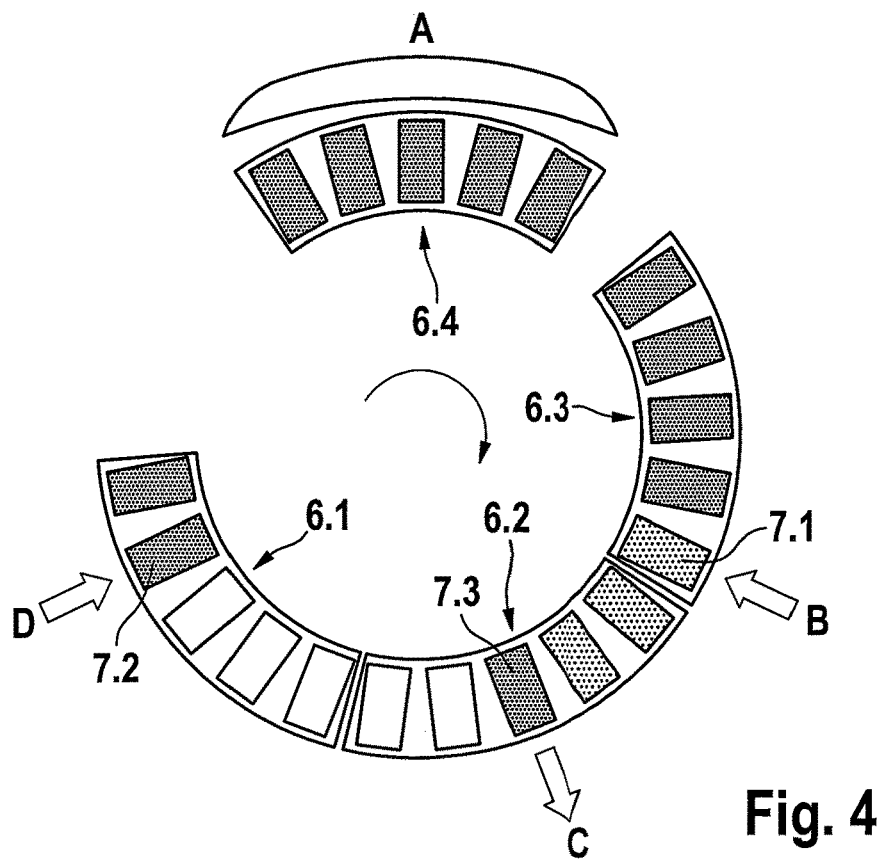
Figure 5:
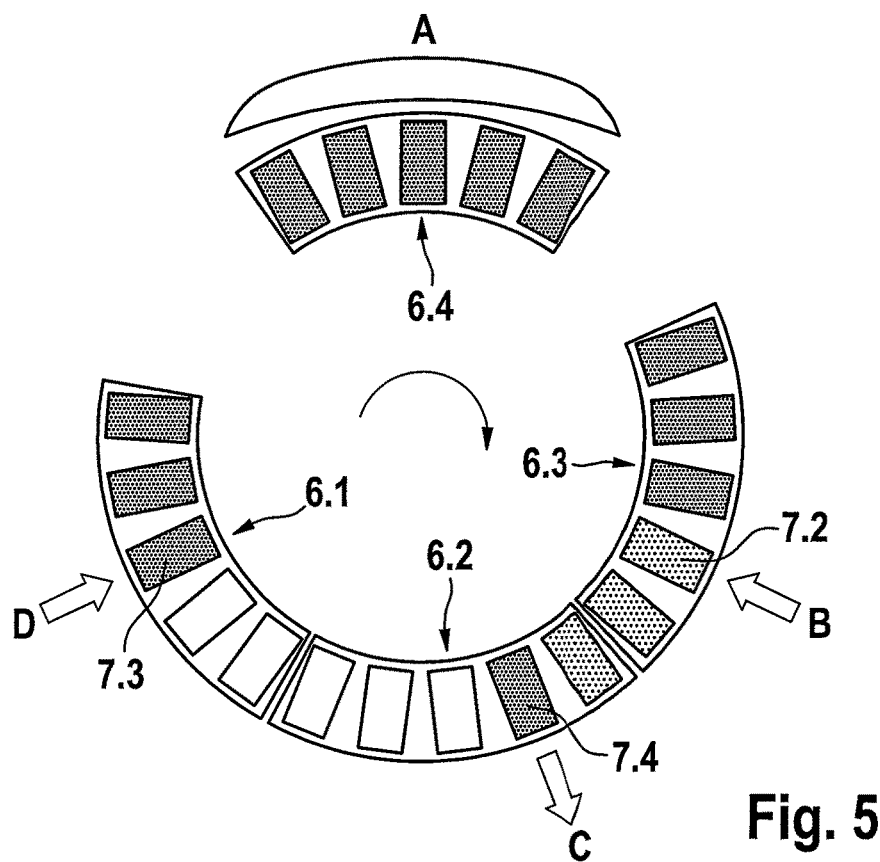
Figure 6:
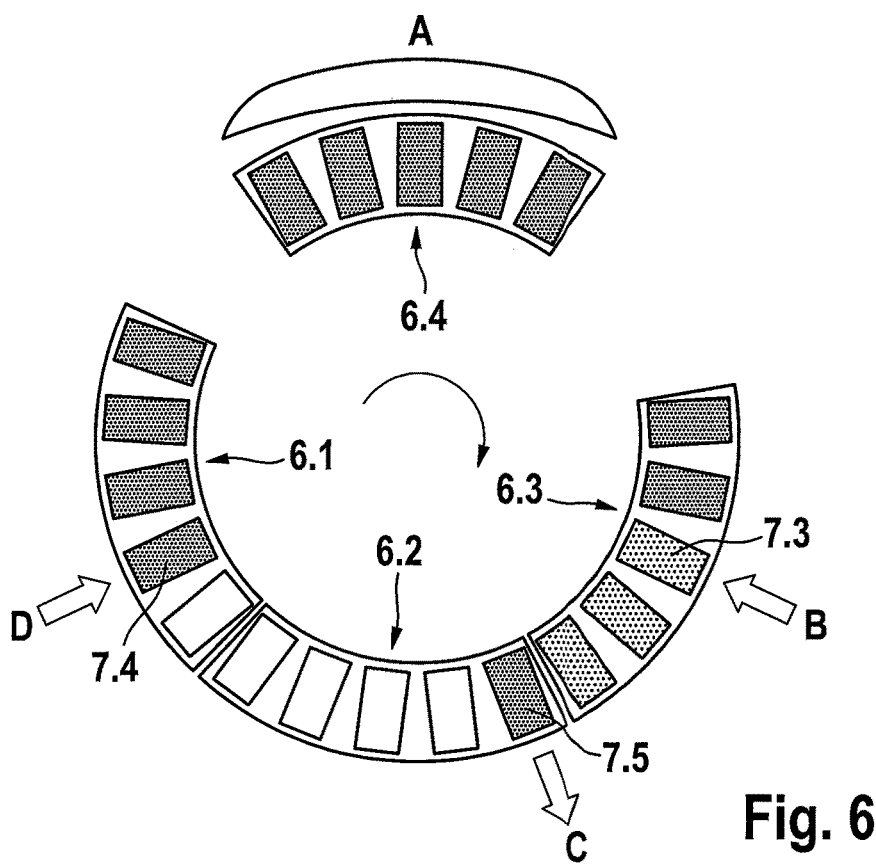
Figure 7:
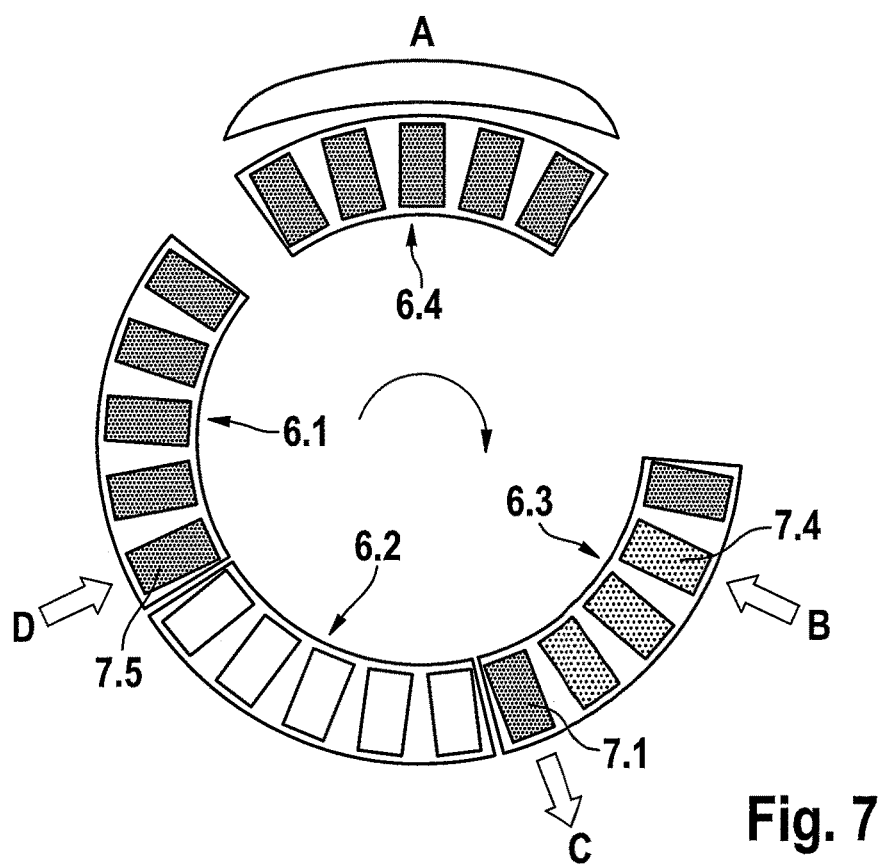
Figure 8:
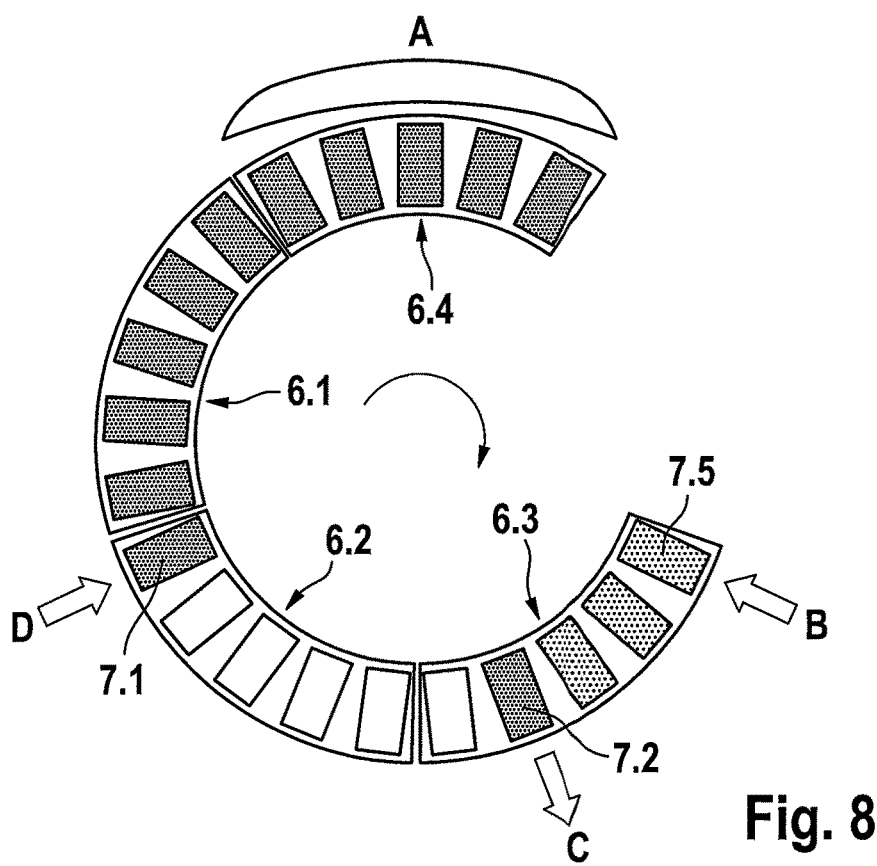
Figure 9:
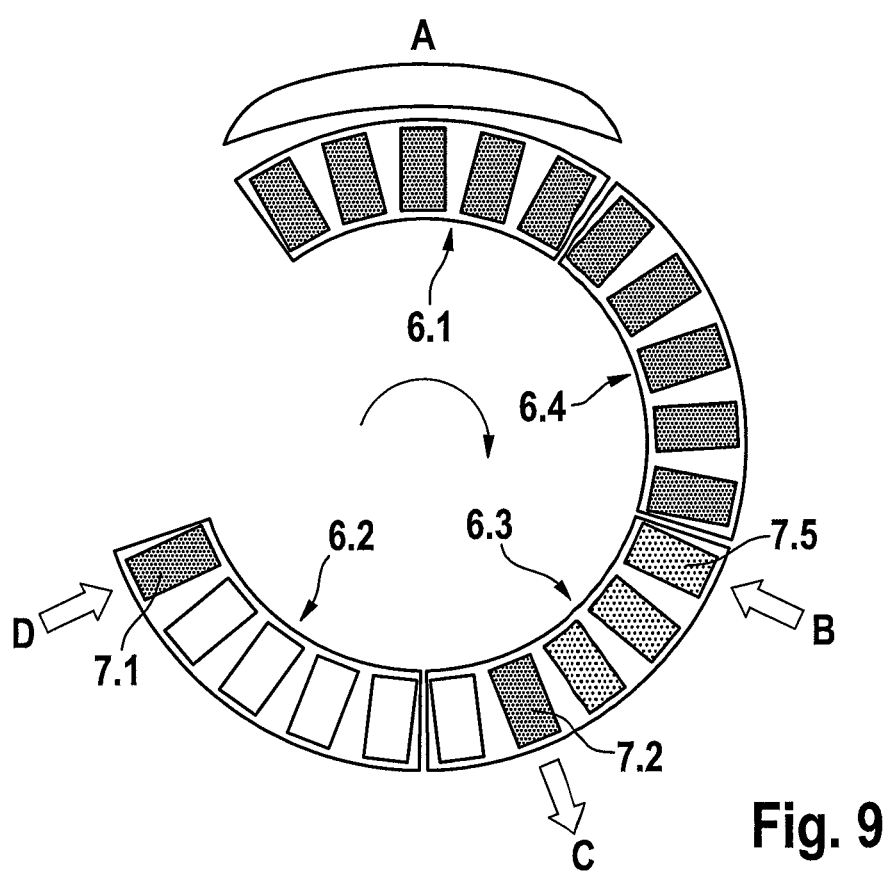
Figure 10:
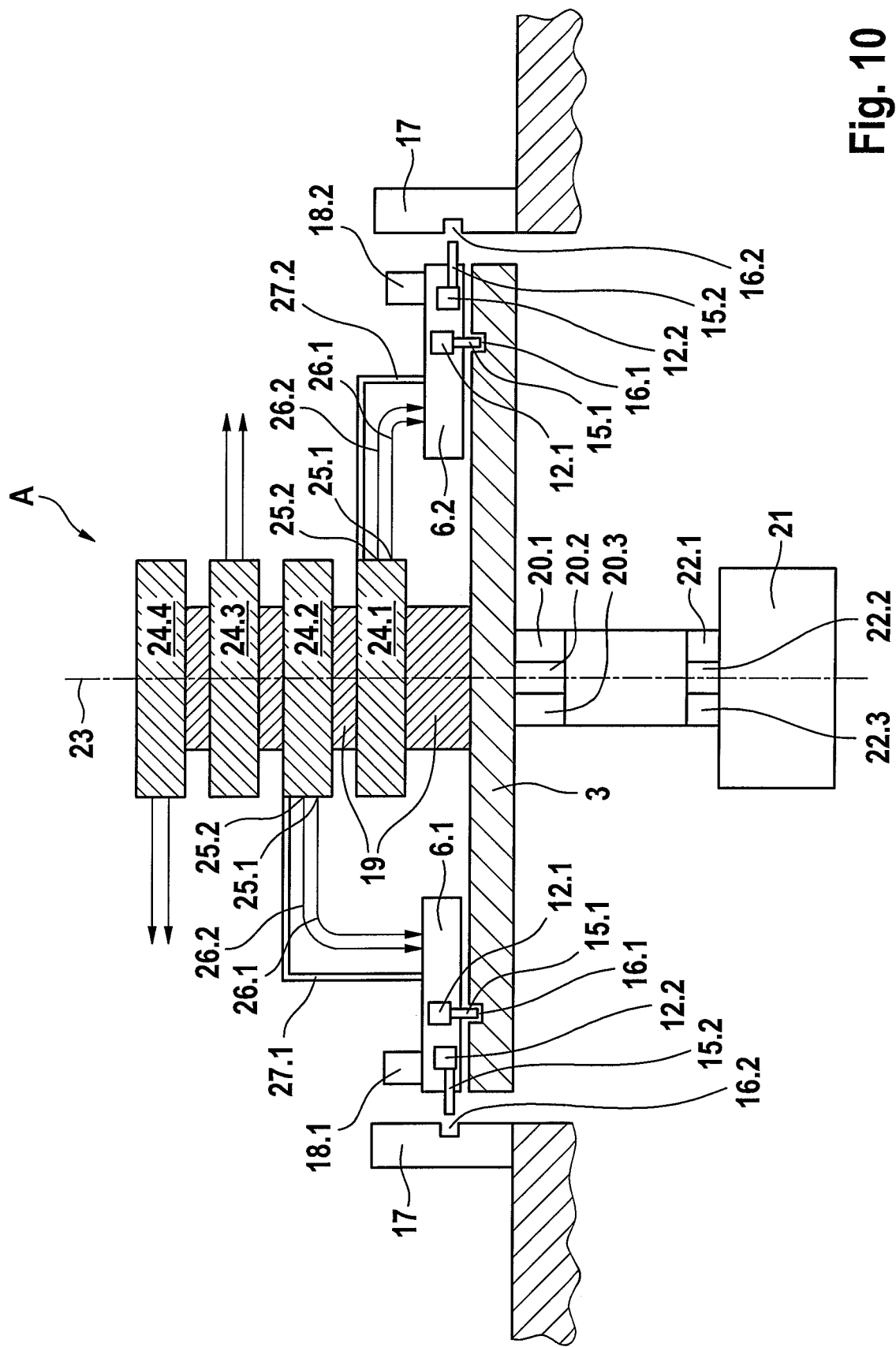
Figure 11:
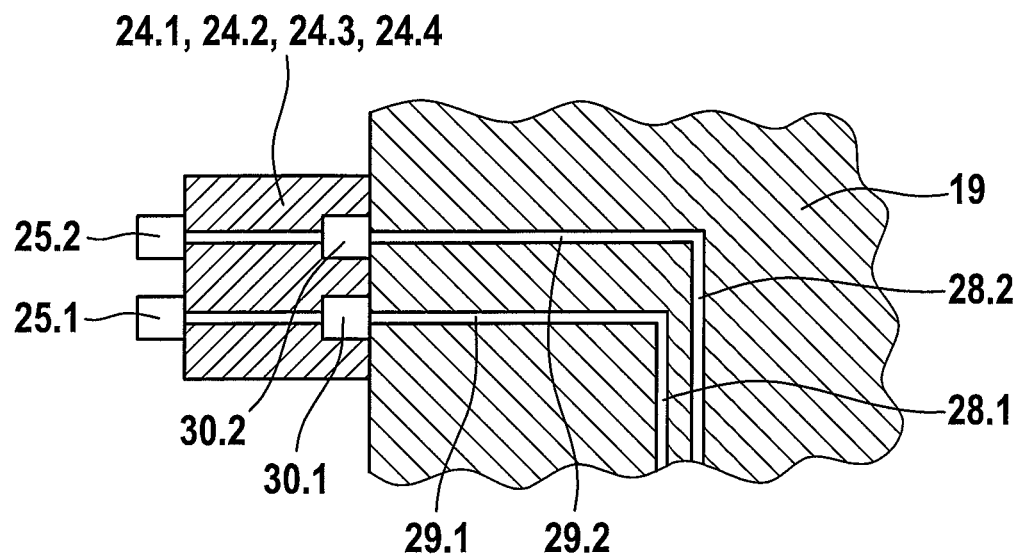
Figure 12:
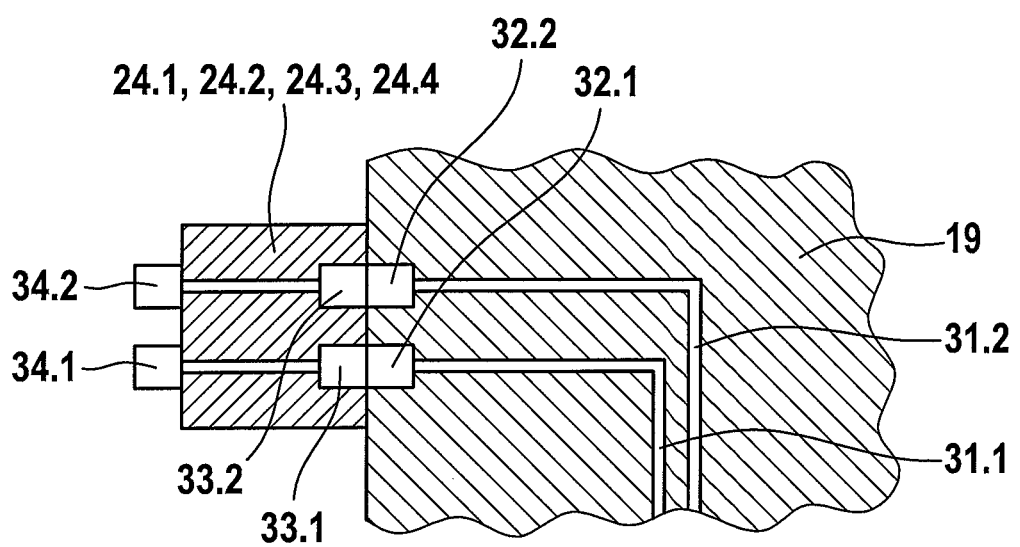

An embodiment of the invention is described in more detail below with reference to the drawings, in which:

FIG. 1 is a highly simplified schematic plan view of an embodiment of a transport device for the rotary feedthrough according to the invention, FIG. 2 is a schematic sectional view of the transport device of FIG. 2, FIG. 3 is a schematic plan view of the first work step of a method for producing products using the transport device, FIG. 4 is a schematic plan view of the second work step of the production method, FIG. 5 is a schematic plan view of the third work step of the method, FIG. 6 is a schematic plan view of the fourth work step of the method, FIG. 7 is a schematic plan view of the fifth work step of the method, FIG. 8 is a schematic plan view of a small cycle of the sixth work step of the method, FIG. 9 is a schematic plan view of a large cycle of the sixth work step of the method, FIG. 10 is a highly simplified schematic view of the transport device according to the invention which comprises the rotary feedthrough according to the invention, FIG. 11 is an enlarged partial cross-sectional view of the rotary feedthrough according to the invention, and FIG. 12 is an enlarged partial cross-sectional view of a further embodiment of the rotary feedthrough according to the invention.

The rotary feedthrough according to the invention is intended for a transport device which is described in detail in the following with reference to FIGS. 1 to 9. The transport device is the subject matter of the not yet published German patent application DE 10 2016 004 335.0.

The transport device according to the invention comprising the rotary feedthrough according to the invention is described with reference to FIGS. 10 to 12.

FIGS. 1 and 2 show in a highly simplified schematic view an embodiment of the transport device according to the invention in plan view (FIG. 1) and side view (FIG. 2) without the rotary feedthrough according to the invention. The figures only show the components of the transport device that are essential to the invention. The figures are merely for illustrative purposes. The size ratios between the individual components do not necessarily correspond to the actual ratios.

The transport device is in the form of a rotary indexing table. The rotary indexing table 1 comprises a housing 2 that receives an object carrier 3 that can turn about a vertical central axis 4 of a drive unit 5. In FIGS. 3 to 10, the vertical central axis 4 is perpendicular to the image plane. The drive unit 5 turns the object carrier 3 in steps in successive cycles through a fixed angle of rotation.

The object carrier 3 receives a plurality of object carrier elements. In the present embodiment, the object carrier 3 receives the object carrier elements 6.1, 6.2, 6.3, 6.4. The object carrier elements 6 each comprise a plurality of receiving elements 7. In the present embodiment, the object carrier elements 6 each comprise five receiving elements 7.1, 7.2, 7.3, 7.4, 7.5. Each receiving element can receive one object. However, each object carrier element 6 can also comprise just one receiving element, it also being possible for a receiving element 7 to also receive a plurality of objects. The receiving elements can, for example, be trays, stands, holders or the like.

The object carrier elements 6 are distributed circumferentially on the object carrier 3. Each element delineates the shape of a segment of a circle. When the object carrier turns, for example clockwise, as indicated by an arrow, the carrier elements 6 can move on a circular movement path 8. However, the object carrier elements 6 are not rigidly connected to the object carrier 3, but rather are displaceably guided in the direction of the circular path 8 in a guide 9, which is only shown schematically. Therefore, if the object carrier elements 6 are held in place externally, the object carrier 3 can turn without the object carrier elements being carried along therewith.

In the present embodiment, the individual carrier elements 6 each have a circumferential angle of 360°/5=72°. Since just four object carrier elements 6.1, 6.2, 6.3, 6.4 are provided, one portion of the circular movement path 8 remains empty. This gap allows the object carrier elements 6 to be displaced relative to the object carrier 3 without the object carrier elements obstructing one another. The number of object carrier elements 6 and the circumferential angle of the object carrier elements 6 are determined by the arrangement and number of work stations.

In the present embodiment, which is described in detail below with reference to FIGS. 3 to 9, the transport device is a part of a production facility that has four work stations. The work stations are not shown in FIGS. 1 and 2. They are distributed circumferentially around the object carrier 3 of the rotary indexing table 1.

The transport device also has a plurality of dog elements. In the present embodiment, all the object carrier elements 6 are displaceably guided. Therefore, each object carrier element 6.1, 6.2, 6.3, 6.4 is assigned a dog element 10. FIG. 2 only shows three dog elements 10.1, 10.2, 10.3. All the dog elements are actuated by an actuation unit, which comprises actuation members 12 assigned to the individual dog elements. In FIGS. 1 and 2, the actuation unit in the form of a device comprising the actuation members 12 is denoted by reference sign 11. The actuation members 12 can, for example, comprise electrical, magnetic, electromagnetic, pneumatic or hydraulic drives.

In the present embodiment, the dog elements 10 are pins that engage in recesses 13 in the object carrier elements 6. The dog elements 10 can be actuated by the actuation members 12 of the actuation unit 11 in such a way that said elements assume a state in which they engage in a recess 13 in an object carrier element 6 or are retracted from the recess. As a result, the object carrier elements 6 can be secured on the object carrier 3. The actuation members 12 can be actuated independently of one another by the actuation unit 11. The object carrier elements 6 can be locked independently of one another.

In addition, the transport device comprises a plurality of retaining elements 14. In the present embodiment, each object carrier element 6 is assigned a retaining element 14.1, 14.2, 14.3, 14.4, (14.5). The retaining elements 14 are actuated by the actuation members 12 of the actuation unit 11. The actuation members 12 for the retaining elements can, for example, comprise electrical, magnetic, electromagnetic, pneumatic or hydraulic drives. The retaining elements 14 are distributed circumferentially around the object carrier 3. Unlike the catch elements 10, the retaining elements do not move together with the object carrier 3, but instead are rigidly connected to the housing 2 of the transport device. The retaining elements 14 can, for example, be pressure pistons that are displaceable in the longitudinal direction and are pushed onto the outer circumferential surfaces of the object carrier elements 6 such that the object carrier elements are held in place externally.

In addition, the transport device has a control unit 15 for the actuation unit 11. The control unit 15 can be a freely programmable control unit by which the individual actuation members 12 of the actuation unit 11 can be actuated independently of one another at certain times, such that the dog and retaining elements 10, 14 are actuated.

The control unit 15 is designed such that, in some cycles, the dog element 10 assigned to one object carrier element 6 assumes an active state and the retaining element 14 assigned to the object carrier element assumes an inactive state such that the object carrier element 6 is carried along by the object carrier 3 and moved from work station to work station. The control unit 15 is also designed such that, in some cycles, the dog element 10 assigned to the object carrier element 6 assumes an inactive state and the retaining element 14 assumes an active state such that the object carrier element remains at a work station.

FIGS. 3 to 9 show the individual work steps of a method for producing a product. In the present embodiment, the production method is a method for producing containers filled with a medical product, in particular for producing bags filled with a medical solution, in particular film bags for peritoneal dialysis. FIGS. 3 to 9 are merely used to illustrate the basic principle of the method. Therefore, not every method step required to produce the product is shown.

The production facility comprises at least one transport device described with reference to FIGS. 1 and 2. FIG. 3 schematically shows just the four object carrier elements 6.1, 6.2, 6.3, 6.4 of the transport device (rotary table). In the present embodiment, the production facility comprises four work stations A, B, C, D (only shown by way of indication) that are distributed circumferentially around the object carrier 3. The containers, in particular film bags, are provided as blanks that are not provided with a connection piece, in particular a welded shuttle, and are not filled with the medical product, in particular a fluid, for example a solution for peritoneal dialysis. The work station A is a filling station, by which the bags provided with the connection piece are filled. Filling the bags is a work process having a long process time. The process time is considerably longer than the process time of the other work stations. The work station B having a short process time is a work station by which the bag blanks are fitted with the connection pieces. The work station C is a work station for removing the bags that have been provided with the connection piece and filled, and the work station D is a work station for setting down the bag blanks. The work stations B, C, D have a process time that is shorter than the process time of work station A.

The drive unit 5 turns the object carrier 3 in steps clockwise in successive short or long cycles. In the present embodiment, the object carrier 3 is turned clockwise in a short cycle through 14.4° (360°/5 (five carrier elements)/5 (five receiving elements 7.1, 7.2, 7.3, 7.4, 7.5 per carrier element=14.4°). The dog elements 10 and retaining elements 14 (FIGS. 1 and 2) are not shown in FIGS. 3 to 9.

The described method is distinguished by a combination of single cycles for the work stations B, C, D having short process times and multiple cycles for the work station A having the long process time. For this purpose, the single cycles have to be collected upstream of the work station A having the long process time and the multiple cycle has to be collected downstream of the work station A having the long process time. The single cycles and the multiple cycle are collected in waiting areas WZ in the direction of rotation (clockwise) upstream and downstream of the work station A having the long process time. In the following, the individual work steps will be described.

FIG. 3 shows the first work step (starting position). The four object carrier elements 6.1, 6.2, 6.3, 6.4 are arranged such that, in the first work step, there are no object carrier elements in the waiting area WZ upstream of the work station A having the long process time. The bag blanks are located in the receiving elements 7.1, 7.2, 7.3, 7.4, 7.5 of the third and fourth object carrier element 6.3, 6.4. The waiting area WZ upstream of the work station A having the long process time is empty and the waiting area WZ downstream of the work station A is full. The work station A for the filling process having the long process time and the work stations B, C, D for the work processes having the short work times are all in operation. The work station B fits a connection piece, for example a cover cap, to the filled bag located in the fifth receiving element 7.5 of the second object carrier element 6.2. The work station C removes the finished bag that is located in the second receiving element 7.2 of the second object carrier element 6.2 and has been provided with the connection piece and filled with the solution, and the work station D puts a bag blank in the first receiving element 7.1 of the first object carrier element 6.1.

FIG. 4 shows the second work step. The control unit 15 activates the actuation unit 11 such that the dog elements 10 assigned to the first, second and third object carrier elements 6.1, 6.2, 6.3 are active and the retaining elements 14 assigned to said object carrier elements are inactive, while the dog element 10 assigned to the fourth object carrier element 6.4 is inactive and the retaining element 14 assigned to said object carrier element is active. As a result, the first, second and third object carrier elements 6.1, 6.2, 6.3 are carried along when the object carrier 3 turns clockwise, and the fourth object carrier element 6.4 is held in place. After the object carrier 3 has turned through a predetermined angle of rotation (360°/(5×5)=14.4°), the waiting area WZ upstream of the long process contains just one bag blank, and the waiting area WZ downstream of the long process is occupied by four filled bags. The work station B fits a connection piece to the filled bag located in the first receiving element 7.1 of the third object carrier element 6.3. The work station C removes the finished bag that is located in the third receiving element 7.3 of the second object carrier element 6.2 and has been provided with the connection piece and filled with the solution, and the work station D places a bag blank in the second receiving element 7.2 of the first object carrier element 6.1.

In the third work step (FIG. 5), the control unit 15 reactivates the actuation unit 11 such that the first, second and third object carrier elements 6.1, 6.2, 6.3 are carried along and the fourth object carrier element 6.4 is held in place. The object carrier 3 turns again through a predetermined angle of rotation (14.4°). After the object carrier 3 has turned, the waiting area WZ upstream of the long process contains two bag blanks, and the waiting area downstream of the long process is occupied by three filled bags. The work station B now fits a connection piece to the filled bag located in the second receiving element 7.2 of the third object carrier element 6.3. The work station C removes the finished bag from the fourth receiving element 7.4 of the second object carrier element 6.2 and the work station D puts a bag blank in the third receiving element 7.3 of the first object carrier element 6.1.

In the fourth work step (FIG. 6), the first, second and third object carrier elements 6.1, 6.2, 6.3 are once again carried along, while the fourth object carrier element 6.4 is held in place. After the object carrier has turned through the predetermined angle of rotation (14.4°), the waiting area WZ upstream of the long process contains three bag blanks, and the waiting area WZ downstream of the long process is occupied by two filled bags. The work station B fits a connection piece to the filled bag located in the third receiving element 7.3 of the third object carrier element 6.3, the work station B removes the finished bag from the fifth receiving element 7.5 of the second object carrier element 6.2, and the work station D puts a bag blank in the fourth receiving element 7.4 of the first object carrier element 6.1.

In the fifth work step (FIG. 7), the first, second and third object carrier elements 6.1, 6.2, 6.3 are carried along, while the fourth object carrier element 6.4 is held in place. After the object carrier 3 has turned through the predetermined angle of rotation (14.4°), the waiting area WZ upstream of the long process contains four bag blanks, and the waiting area WZ downstream of the long process is occupied by one filled bag. The connection piece is fitted to the filled bag located in the fourth receiving element 7.4 of the third object carrier element 6.3, the finished bag located in the first receiving element 7.1 of the third object carrier element 6.3 is removed, and a bag blank is put in the fifth receiving element 7.5 of the first object carrier element 6.1.

Next comes the sixth work step, which includes a small cycle (FIG. 8) in which the object carrier rotates through an angle of rotation of 14.4°, and a large cycle (FIG. 9) in which the object carrier 3 rotates through an angle of rotation of 72° (5*14.4°=72°). In the small cycle, the first, second and third object carrier elements 6.1, 6.2, 6.3 are carried along, and the fourth object carrier element 6.4 is held in place. After the object carrier has rotated through 14.4° (small cycle), the waiting area WZ upstream of the long process is full and the waiting area WZ downstream of the long process is empty. A connection piece is fitted to the filled bag located in the fifth receiving element 7.5 of the third object carrier element 6.3, the finished bag is removed from the second receiving element 7.2 of the third object carrier element 6.1, and a bag blank is put in the first receiving element 7.1 of the second object carrier element 6.2.

In the large cycle (FIG. 9) of the sixth work step following the small cycle, the control unit 15 activates the actuation unit 11 such that the first and fourth object carrier elements 6.1, 6.4 are carried along and the second and third object carrier elements 6.2, 6.3 are held in place. In the large cycle, the object carrier 3 turns through 72° (5*14.4°=72°). After the object carrier 3 has turned, the waiting area WZ upstream of the long process is empty and the waiting area WZ downstream of the long process is full, and so the first work step (FIG. 3) can come next again.

In the sixth work step, the sum of the cycle time of the small cycle $t_{TK}$ and the cycle time of the long cycle $t_{TL}$ is smaller than the overall process time of the short cycle $t_{GK}$ ($t_{TK}+t_{TL}<t_{GK}$).

The above-described process corresponds to a five-fold parallel operation of the longest process.

When designing the production facility, the following laws arise:

$t_{PK}$ process time of the short process
$t_{PL}$ process time of the long process
$t_{TK}$ cycle time of the short cycle
$t_{TL}$ cycle time of the long cycle
$t_{GK}$ overall process time of the short cycle
$t_{GL}$ overall process time of the long cycle
S scaling actuator
WZ waiting area
$A_{OTE}$ number of object carrier elements
$A_{WZ}$ number of waiting areas
LP process having the long process time
KP process having the short process time
Overall process time of the short cycle:

$$t_{GK}=t_{PK}+t_{TK}$$

The short and long cycles must be within the cycle time of the short cycle:

$$t_{TK}+t_{TL}<t_{GK}$$

Overall process time of the long cycle:

$$t_{GL}=t_{PL}+t_{TLK}$$

Calculation of the necessary multiplication of the longest processing step:

$$t_{GL}A_{GK}=S$$

Depending on which facility part is set to be the bottleneck of the overall system, S has to be rounded up or down.

The number of coupled object carriers per segment:

$$S*\text{object carrier}=\text{object carrier element}$$

Number of object carrier elements per system:

$$A_{OTE}\geq 2(1\times\text{short process},1\times\text{long process})$$

Number of WZ per system:

$$A_{WZ}\geq 2(WZ \text{ necessary per change from short process to long process}, WZ \text{ necessary per change from long process to short process})$$

In the following, the rotary feedthrough according to the invention and the transport device according to the invention comprising the rotary feedthrough according to the invention is described with reference to FIGS. 10 to 12. The corresponding parts are provided with the same reference signs. The described embodiment of the transport device according to the invention differs from the transport device according to FIGS. 1 to 9 in that the rotary feedthrough according to the invention is provided. The rotary feedthrough is denoted in FIG. 10 by the reference sign A. Furthermore, the described embodiment of the transport device according to the invention differs from the transport device according to FIGS. 1 to 9 by the actuation unit for actuating the actuation members for the retaining elements and the dog elements. All of the actuation members of the retaining elements and the dog elements are located on the object carrier elements. The retaining elements and dog elements are pins in the present embodiment. The actuation members of the pin-like retaining elements and the dog elements are located on the object carrier elements 6. The object carrier elements 6 each comprise a first actuation member 12.1 which actuates a pin-like dog element 15.1 that can be pulled forward or backward into a recess 16.1 of the object carrier 3, so that the object carrier element 6.1 is carried along or released by the object carrier 3. Furthermore, the object carrier elements 6 have a second actuation member 12.2 which actuates a pin-like retaining element 15.2 that can be pulled forward or backward into a recess 16.2 of a stationary component 17, so that the object carrier element 6.2 is locked or released on the stationary component 17. Actuation members which are assigned to stationary components are therefore not present in this embodiment.

Furthermore, some or all of the object carrier elements 6 can be assigned additional actuation members 18.1, 18.2 which move together with the object carrier elements. Said actuation members can be used for actuating additional devices which influence objects. Said devices, which can have different functions, are not shown in the figures. Devices can also be provided on the object carrier elements 6 which are supplied with particular resources, which can be provided by the rotary feedthrough.

The actuation members described above are understood to be actuator units within the meaning of the present invention. The actuation members 12.1, 12.2; 18.1, 18.2 (actuator units) are supplied with media by means of the rotary feedthrough A according to the invention. If the actuation members are pneumatic actuation members they are supplied with compressed air. Electric or electromagnetic actuation members are supplied with electric power.

The rotary feedthrough according to the invention comprises a stationary component 19 which can penetrate the object carrier 3 in the centre. The stationary component 19 comprises at least one media input 20. In the present embodiment, a plurality of media inputs 20.1, 20.2, 20.3 is provided, which are only indicated in FIG. 10, by means of which different media can be provided, including compressed air for actuating the actuation members.

The transport device also comprises a central supply device 21 which has one or more supply lines 22.1, 22.2, 22.3, for example hose lines or electrical lines, which are connected to the one or more media inputs 20.1, 20.2, 20.3 of the rotary feedthrough. The supply lines are only indicated in FIG. 10.

Furthermore, the rotary feedthrough comprises a plurality of components 24.1, 24.2, 24.3, 24.4 which are rotatable independently of one another about a common central axis 23 relative to the stationary component 19. The rotary components 24.1, 24.2, 24.3, 24.4 are arranged one above the other. In the present embodiment, one rotary component 24.1, 24.2, 24.3, 24.4 is assigned to each object carrier element 6.1, 6.2, 6.3, 6.4. In FIG. 10, only two of the four object carrier elements 6.1, 6.2, 6.3, 6.4 are shown. Therefore, four rotary components are provided. The rotary components 24.1, 24.2, 24.3, 24.4 each comprise one or more media outputs 25.1, 25.2. In the present embodiment, the rotary components each have two media outputs 25.1, 25.2, to which flexible connection lines 26.1, 26.2 are connected which lead to the actuation member 12.1 of the dog element 10 or to the actuation member 12.2 of the retaining element 14. In FIG. 10, the connection lines 26.1, 26.2 are only indicated. If an additional actuator unit 18.1, 18.2 is provided on an object carrier element 6.1, 6.2, additional media outputs can be supplied.

The rotary components 24.1, 24.2, 24.3, 24.4 are rigidly connected to the associated object carrier element 6.1, 6.2. For this purpose, a coupling element 27.1, 27.2 is assigned to each rotary component. FIG. 10 shows only the coupling elements of the object carrier elements 6.1, 6.2. The coupling element can be rod or linkage. If the object carrier element 6.1, 6.2 is carried along by the object carrier 3, the rotary component 24.1, 24.2, 24.3, 24.4 rotates together with the object carrier element relative to the stationary component 19 of the rotary feedthrough about the central axis 23 of the transport device.

FIG. 11 shows a part of the rotary feedthrough in an enlarged view. The stationary component 19 is a cylindrical body and the rotary components 24.1, 24.2, 24.3, 24.4 are annular bodies which surround the stationary component 19. In the stationary component 19, axial channels 28.1, 28.2 are formed, to which the radial bores 29.1, 29.2 connect. The radial bores 29.1, 29.2 are sealed off from annular gaps 30.1, 30.2 which are formed in the rotary component. The sealing is achieved by rotary or sliding seals (not shown). In the present embodiment, the rotary component 24.1, 24.2, 24.3, 24.4 comprises two media outputs 25.1, 25.2 to which the two axial channels 30.1, 30.2 lead. The axial channels can also lead to media outputs of one or more other rotary components.

FIG. 12 shows a part of the rotary feedthrough in an enlarged view for supplying an electric or electromagnetic actuation member with power. In the stationary component 19, electrical lines 31.1, 31.2 are provided which lead to sliding contacts 32.1, 32.2 which slide annular contacts 33.1, 33.2 provided in one or more rotary component 24.1, 24.2, 24.3, 24.4. In the present embodiment, two electric connections 34.1, 34.2, to which electric lines (not shown) can be connected, are provided on the rotary component 24.1, 24.2, 24.3, 24.4.

The use of the rotary feedthrough according to the invention is not restricted to the embodiment of the transport device according to FIGS. 10 to 12. The embodiment described with reference to FIGS. 1 to 9 can also comprise the rotary feedthrough. In the embodiment according to FIGS. 10 to 12, the rotary feedthrough is particularly advantageous, as the actuation of the dog elements and the retaining elements does not require stationary machine technology, which makes the rotary feedthrough possible in the first place. The actuation unit for the dog elements and the retaining elements can be provided on the object carrier element. Both actuation members (actuator units) 12.1, 12.2 for the dog element 10 or retaining element 14 can be supplied with medium, for example compressed air, independently of one another and thus can be actuated independently of one another.

In a further embodiment, a positive coupling of the two actuation members 12.1, 12.2 can be provided such that the actuation member of the dog element is actuated when the actuation member of the retaining element is not actuated or vice versa, so that the associated object carrier element is released or locked in place. If such a positive coupling of the actuation members is provided, it is not necessary to have two separate media lines, for example compressed air lines, for supplying the actuation members. Rather, a single compressed air supply is sufficient. The changeover can be performed only in that compressed air is applied or is not applied to an actuator. It is therefore not possible for a fault to occur where the object carrier element is simultaneously released or locked. The risk of collision is thus reduced.

In a preferred embodiment, both actuation members, namely the actuation member of the dog element and the actuation member of the retaining element, can be formed by a single actuator. To control the object carrier element, a positive coupling of the two actuation members can thus be provided such that the actuation member of the dog element is actuated when the actuation member of the retaining element is not actuated or vice versa, and therefore the associated object carrier element is either released or locked. If such a positive coupling of the actuation members is provided, two separate media lines, for example compressed air lines, are not necessary for supplying the actuation members, but only one media line. In the example of the compressed air line, the changeover can be performed by means of a double-acting compressed air cylinder, either just one input of the compressed air cylinder or just the other input of the compressed air cylinder being connected to a source of compressed air by means of a switch valve, and the compressed air cylinder thus only actuating the actuation member of the dog element or only the actuation member of the retaining element.

The invention claimed is:

1. Rotary feedthrough for a transport device comprising a rotary object carrier which comprises object carrier elements arranged so as to be distributed around the circumference, of which at least one of the object carrier elements is arranged on the object carrier so as to be displaceable relative to the object carrier on a circular path or can be locked in place on the object carrier, the rotary feedthrough comprising a stationary component having one or more media inputs for providing one or more media to supply one or more actuator units of one of the object carrier elements, wherein the rotary feedthrough comprises a plurality of rotary components which are rotatable independently of one another about a common central axis relative to the stationary component and each have one or more media outputs, the stationary component and the rotary components being designed such that a media connection is formed between one of the media inputs of the stationary component and one of the media inputs of the rotary components, or a plurality of the media inputs of the stationary component and a plurality of media outputs of the rotary components.

2. Rotary feedthrough according to claim 1, wherein each of the rotary components comprises a coupling element which is designed such that the rotary component can be coupled to one of the object carrier elements.

3. Rotary feedthrough according to claim 2, wherein the coupling element is a rod or linkage.

4. Rotary feedthrough according to claim 1, wherein the stationary component is designed as a cylindrical body and the rotary components are designed as bodies that surround the stationary component, the rotary components being arranged one above the other so as to be rotatable about the central axis of the stationary component.

5. Rotary feedthrough according to claim 4, wherein at least one axial channel which is in connection with a radial bore assigned to one of the rotary components is formed in the stationary component, and each of the rotary components has at least one annular gap which is configured for transferring the one or more media from the radial bore to the media output of the rotary component, the at least one annular gap being sealed off from the stationary component by means of at least one rotary seal and/or sliding seal.

6. Rotary feedthrough according to claim 5, wherein the rotary components are designed as an annular bodies which each have one or more radial media outputs.

7. Transport device for transporting objects from work station to work station of a production facility comprising a rotary object carrier which comprises object carrier elements arranged so as to be distributed around the circumference, of which at least one of the object carrier elements is arranged on the object carrier so as to be displaceable relative to the object carrier on a circular path or can be locked in place on the object carrier,
wherein the transport device comprises a rotary feedthrough according to claim 1.

8. Transport device according to claim 7, wherein the transport device comprises a central media supply facility which is connected to the one or more media inputs of the rotary feedthrough by one or more supply lines for supplying the one or more media.

9. Transport device according to claim 7, wherein the rotary feedthrough is arranged such that the stationary component is arranged centrally on the object carrier or penetrates the object carrier in the center, the rotary components being arranged above the object carrier elements.

10. Transport device according to claim 7, wherein the object carrier elements each comprise one or more actuator units, the one or more actuator units being connected to the one or more media outputs of one of the rotary components by means of connection lines in order to provide the one or more media.

11. Transport device according to claim 10, wherein the connection lines are flexible hose lines.

12. Transport device according to claim 7, wherein
the object carrier elements are assigned movable dog elements which can move between an active state, in which relative movement between the object carrier element and object carrier is prevented, and an inactive state, in which relative movement between the object carrier element and object carrier is permitted, and
the object carrier elements are assigned stationary retaining elements that can move between an active state, in which the object carrier element is held in place, and an inactive state, in which the object carrier element is released,
an actuation unit or actuating the dog elements and retaining elements and a control unit for the actuation unit are provided, the control unit being designed such that, in some cycles of the successive cycles, the dog element assumes an active state and the retaining element assumes an inactive state such that the at least one object carrier element is carried along by the object carrier and moved from work station to work station, and, in some cycles of the successive cycles, the dog element assumes an inactive state and the retaining element assumes an active state such that the at least one object carrier element remains at a work station.

13. Transport device according to claim 7, wherein the object carrier comprises a guide path in which the object carrier elements are guided in a freely movable manner.

14. Transport device according to claim 7, wherein the object carrier elements comprise a plurality of receiving elements which are each designed to receive an object.

15. Transport device according to claim 12, wherein the dog elements are designed such that an interlocking and/or frictional connection can be established between a part of the object carrier element and a part of the object carrier.

16. Transport device according to claim 12, wherein the retaining elements are designed such that an interlocking and/or frictional connection can be established between a part of the object carrier element and a stationary part.

17. Production facility for producing products, comprising a transport device for transporting objects according to claim 7, wherein a plurality of work stations is provided, each of the work stations being designed to carry out at least one work process, which includes at least one work step, on at least one product arranged on one of the object carrier elements.

18. Method for transporting objects from work station to work station of a production facility, comprising the following method steps:
arranging a plurality of object carrier elements for placing down one or more objects on a rotary object carrier,
rotating the object carrier in successive cycles in such a way that the object carrier elements are transported on a circular movement path from work station to work station,
wherein
at least one object carrier element of the plurality of object carrier elements is arranged on the object carrier so as to be displaceable relative to the object carrier in the direction of the circular movement path,
in some cycles of the successive cycles, relative movement between the at least one object carrier element and the object carrier is prevented such that the at least one object carrier element is carried along by the object carrier and moved from work station to work station, and
in some cycles of the successive cycles, relative movement between the at least one object carrier element and the object carrier is permitted and the at least one object carrier is held in place such that the at least one carrier element remains at a work station,
supplying actuator units which are arranged on the object carrier elements with one or more media,
the one or more media being supplied to the actuator units from a central supply device via a rotary feedthrough.

* * * * *